Patented Aug. 20, 1946

2,406,106

UNITED STATES PATENT OFFICE 2,406,106

TERPENE DERIVATIVES

Alfred L. Rummelsburg, Wilmington, Del., assignor to Hercules Powder Company, Wilmington, Del., a corporation of Delaware No Drawing. Application December 8, 1943, Serial No. 513,483

10 Claims. (Cl. 260—617)

This invention relates to a new series of terpene derivatives and more particularly to a new series of terpene derivatives resulting from the hydrogenation of condensation products of acyclic terpenes having three double bonds per molecule and acrolein. It also relates to a method for the preparation of these derivatives.

By the method in accordance with this invention, a condensation product of an acyclic terpene having three double bonds per molecule and acrolein is reacted with hydrogen. In this manner there is obtained a cyclic primary alcohol which may or may not be saturated depending upon the conditions under which the hydrogenation reaction is carried out.

A condensation product of acrolein and an acyclic terpene having three double bonds per molecule as, for example, allo-ocimene, ocimene, myrcene, cryptotaenene, etc., is first prepared. This condensation product is then hydrogenated to form a primary alcohol. Hereinafter, in this specification an acyclic terpene having three double bonds per molecule will be referred to for convenience as an acyclic terpene.

The method in accordance with this invention is illustrated by the examples which follow. All parts and percentages are by weight unless otherwise specified.

Example 1

A condensate of myrcene and acrolein was prepared by heating a mixture containing 80 parts of myrcene, ($n_D^{20}$ 1.475, $d_4^{20}$ 0.8023) 50 parts acrolein, and 0.5 part tert-butyl catechol as a polymerization inhibitor, to 175° C. in a nitrogen atmosphere in a stainless steel autoclave for 6 hours. After cooling to 30° C., the mixture was removed and distilled at 18 mm. pressure until the bath temperature reached 104° C. and the vapor temperature reached 70° C., in order to remove the excess acrolein. The distillation was then continued at 1 mm. The results of the distillation are shown in the following table:

| Fraction | Vapor temperature, ° C. | Yield, parts | Percent combined acrolein as acrolein |
|---|---|---|---|
| 1 | 100–126 | 71 (pale liquid) | 28.3 |
| 2 | 126–150 | 13 (pale liquid) | 27.0 |
| Residue | | 10 (viscous resin) | |

Calculated percentage of combined aldehyde as acrolein for a condensate containing one mole acrolein per mole of myrcene is 29.3%.

Twenty-five parts myrcene-acrolein condensate from the first and second fractions was hydrogenated in the presence of 1.6 parts copper chromite catalyst in a stainless steel autoclave. The contents were heated under pressure in accordance with the following schedule:

| Time, hours | Temperature, ° C. | Pressure, lb. per sq. in. |
|---|---|---|
| Start | 28 | 2,000 |
| 1 | 180 | 1,960 |
| 2 | 180 | 1,775 |
| 3 | 180 | 1,740 |
| 4 | 180 | 1,740 |
| 13 | 27 | 1,225 |

About 1.5% hydrogen by weight was absorbed. The theoretical amount of hydrogen for reduction of the aldehyde group is 1.04% and for the reduction of the aldehyde and hydrogenation of two double bonds is 3.12%.

The hydrogenated material was removed from the autoclave and diluted with ethyl alcohol. The catalyst was removed from the product by filtration and the filtrate was distilled at 18 mm. to a bath temperature of 100° C. to remove the alcohol. The residue was distilled at 1 mm. pressure to a bath temperature of 165° C. Nineteen parts of distillate, which was a nearly colorless oil, was obtained. This product was analyzed with the following results:

$d_4^{20}$ ---------------------------------------- 0.9344
$n_D^{20}$ ---------------------------------------- 1.4910
Per cent OH (by acetylation) __ 8.6 (theory 8.75)

Example 2

Twenty-five parts of myrcene-acrolein condensate, prepared by the method described in Example 1, were mixed with 5.2 parts Raney nickel catalyst which had previously been washed with isopropyl alcohol. The condensate was then hydrogenated in a stainless steel autoclave. The contents were heated under pressure according to the following schedule:

| Time, hours | Temperature, ° C. | Pressure, lb. per sq. in. |
|---|---|---|
| Start | 29 | 2,000. |
| ¾ | 142 | 800 (H₂ added to 2,000). |
| 1⅔ | 200 | 2,125. |
| 2⅝ | 200 | 2,140. |
| 6⅝ | 27 | 1,400. |

About 2.90% hydrogen by weight was absorbed. The theoretical amount of hydrogen for the reduction of the aldehyde and the hydrogenation of two double bonds is 3.12%.

The mixture was filtered to separate the product from the catalyst. The filtrate was distilled at 18 mm. to a bath temperature of 100° C. to remove traces of isopropyl alcohol. The residue was a nearly colorless oil having the following characteristics:

$d_4^{20}$ _____ 0.9014
$n_D^{20}$ _____ 1.4670
Per cent OH (by acetylation) __ 8.4 (theory 8.6%)

Example 3

A mixture containing 80 parts allo-ocimene ($d_4^{20}$0.8139, $n_D^{20}$1.5417), 50 parts acrolein, and 0.5 part tert-butyl catechol (to inhibit polymerization) was heated in a stainless steel autoclave under a nitrogen atmosphere to 175° C. for 6 hours, then cooled to room temperature. The mixture was distilled at 18 mm. to a bath temperature of 130° C., to remove excess acrolein. Distillation was continued at 1 mm. The following table shows the results of the distillation:

| Fraction | Vapor temperature, ° C. | Yield, parts | Percent combined acrolein as acrolein |
|---|---|---|---|
| 1 | 100-110 | 77 | 28.8 |
| 2 | 110-128 | 11 | 29 |
| Residue | | 20 | |

The calculated percentage of combined aldehyde as acrolein for a condensate containing one mole allo-ocimene per mole acrolein is 29.1%.

Twenty-five parts of allo-ocimene-acrolein condensate from the first fraction was hydrogenated in the presence of 1.6 parts of a copper chromite catalyst in a stainless steel autoclave. The contents were heated under pressure according to the following schedule.

| Time, hours | Temperature, ° C. | Pressure, lb. per sq. in. |
|---|---|---|
| Start | 30 | 2,000 |
| 1¾ | 180 | 1,940 |
| 2¾ | 180 | 1,825 |
| 6 | 180 | 1,200 |
| 9 | 180 | 1,000 |
| 10 | 180 | 875 |
| 11 | 180 | 875 |
| 13 | 29 | 580 |

About 2.83% of hydrogen was absorbed. The theoretical amount of hydrogen for the reduction of the aldehyde and the hydrogenation of two double bonds is 3.12%. The mixture was filtered to separate the catalyst. The filtrate was distilled at 1 mm. to a bath temperature of 160° C. The distillate yield was 16.4 parts of nearly colorless oil having the following characteristics:

$d_4^{20}$ _____ 0.9087
$n_4^{20}$ _____ 1.4740
Per cent OH (by acetylation) __ 8.5 (theory 8.75)

Example 4

Twenty-five parts of allo-ocimene-acrolein condensate from the first fraction of Example 3, were hydrogenated in the presence of 5.2 parts Raney nickel catalyst, which had been washed with isopropyl alcohol prior to use. The hydrogenation was carried out in a stainless steel autoclave according to the following schedule:

| Time, hours | Temperature, ° C. | Pressure, lb. per sq. in. |
|---|---|---|
| Start | 28 | 2,000 |
| 1 | 130 | 800 (H₂ added to 2,000) |
| 2½ | 200 | 1,925 |
| 3½ | 200 | 1,925 |
| 5⅚ | 30 | 1,210 |

About 3.38% hydrogen was absorbed. The mixture was filtered to separate the catalyst. The filtrate was distilled at a pressure of 16 mm. to a bath temperature of 100° C. to remove traces of isopropyl alcohol. The yield was 13.1 parts of nearly colorless oil having the following characteristics:

$d_4^{20}$ _____ 0.9015
$n_D^{20}$ _____ 1.4670
Per cent OH (by acetylation) ___ 8.4 (theory 8.6)

Example 5

Twenty parts of allo-ocimene-acrolein condensate from the first fraction of Example 3 are mixed with 10 parts of isopropyl alcohol as a solvent and then hydrogenated in the presence of 5 parts of Adams' platinum oxide catalyst in a Parr shaker. The contents were heated at 40–55° C. at a pressure of 30–55 lbs. per sq. in. for 6 hours. About 3.2% of hydrogen was absorbed after correcting for that required to reduce the platinum oxide. The mixture was filtered to remove the catalyst. The filtrate was distilled at a pressure of 16 mm. to a bath temperature of 100° C. in order to remove the solvent. The resulting colorless oil had the following characteristics:

$d_4^{20}$ _____ 0.9063
$n_D^{20}$ _____ 1.4712
Per cent OH (by acetylation) ___ 8.4 (theory 8.6)

In accordance with this invention a condensation product of an acyclic terpene hydrocarbon having the formula $C_{10}H_{16}$ with acrolein is hydrogenated in the presence of a catalyst. For example, the acyclic terpenes operable in accordance with the invention include allo-ocimene, myrcene, ocimene, and cryptotaenene. The acyclic terpenes may be used either in pure form or mixed with other substances.

The condensation product of an acyclic terpene with acrolein is obtained by heating an acyclic terpene with acrolein. The major portion of condensate results from a Diels-Alder reaction between the acyclic terpene and acrolein and are unsaturated cyclic aldehydes. In addition to the Diels-Alder reaction, in which one molecule of acrolein adds to one molecule of an acyclic terpene, other types of reaction may occur, for example, two molecules of acrolein may react with one molecule of the terpene or vice versa. The extent to which each of these reactions takes place will depend upon the relative proportions of the reactants and the conditions of the reaction. Furthermore, during this condensation any of the above condensation products or reactants may polymerize. It is desirable to add a polymerization inhibitor, such as tert-butyl catechol, phenyl-beta-naphthylamine, etc., in order to hinder the formation of polymerized products. The compound which will greatly predominate in the mixture will be that formed when one molecule of acyclic terpene condenses with one molecule of acrolein, particularly so when the latter is used in slight excess. This same compound can, if desired, be separated from the other constituents by vacuum distillation, or the crude condensate may be reduced as such.

The condensation products from the above procedure are viscous yellow liquids. The product resulting from the addition of one molecule of acrolein to one molecule of allo-ocimene may be referred to as dimethyl(butenyl)tetrahydrobenzaldehyde and the product resulting from the addition of one molecule of acrolein to one molecule of myrcene may be referred to as isohexenyl tetrahydrobenzaldehyde. If desired, the crude condensate may be employed in the process of the invention, as may any of the compounds separable therefrom.

To form a cyclic primary alcohol, in accordance with my invention, any of the aforesaid condensation products of acyclic terpenes with acrolein may be reduced by hydrogen either with or without the use of a suitable hydrogenation catalyst. Preferably, the condensate resulting when equimolar proportions of the reactants are combined will be employed. It is however, preferable to use a catalyst inasmuch as greater selectivity is thereby obtainable. It is possible, by the use of a particular catalyst, as hereinafter described, to hydrogenate only the aldehyde group of the condensate molecule. If only the aldehyde group is reduced, the product is a substitution product of tetrahydrobenzaldehyde. For example, it is believed that dimethyl(butenyl)tetrahydrobenzaldehyde forms dimethyl(butenyl)tetrahydrobenzyl alcohol; isohexenyl tetrahydrobenzaldehyde forms isohexenyl tetrahydrobenzyl alcohol. On the other hand, certain catalysts in conjunction with the use of relatively high conditions of temperatures and pressure, lead to the hydrogenation of the ethylenic bouble bonds of the molecule as well as the aldehyde group. It is believed that the products of this hydrogenation are substitution products of hexahydrobenzyl alcohol, for example, dimethyl(butyl)hexahydrobenzyl alcohol and isohexyl hexahydrobenzyl alcohol.

Without regard to selectivity, the operable catalysts which may be used are active hydrogenation catalysts, and include active copper chromite catalyst, the base metal catalysts, such as active nickel, Raney nickel, etc., the noble metal catalysts such as active platinum, palladium, rhodium, osmium, iridium, and ruthenium. The quantity of catalyst, may vary up to about 10% of the weight of the acyclic terpene-crotonaldehyde condensate, preferably up to about 5.0%. The foregoing catalysts may be used in unsupported form, or, if desired, supported on suitable inert support materials, such as kieselguhr, diatomaceous earth, activated clay, etc. The hydrogenation is desirably carried out at temperatures ranging from about 25° C. to about 250° C., and at a pressure of 15 lbs. per sq. in. to 3000 lbs. per sq. in., depending upon the catalyst and the degree of hydrogenation desired. Using active base metal or copper chromite catalysts the preferable pressure range is from about 250 to about 3000 lbs. per sq. in., and the preferable temperatures range from about 100° C. to about 200° C. Using active noble metal catalysts, the preferable pressure range is from about 15 lbs. per sq. in. to about 100 lbs. per sq. in., and the preferable temperature range from about 25° C. to about 100° C. Hydrogenation is continued until the desired degree of absorption has occurred and may be carried out in a batchwise or continuous manner.

As hereinbefore described, by proper choice of conditions used in carrying out the hydrogenation reaction, either an unsaturated or a saturated alcohol may be obtained. Thus, when active copper chromite catalyst is used under conditions of temperature and pressure within the operable and preferred ranges for this catalyst, as disclosed above, in most cases the aldehyde group is preferentially hydrogenated and an unsaturated alcohol results. On the other hand, the use of active noble or base metal catalysts, in particular, active nickel, platinum, or palladium catalysts, under conditions of temperature and pressure within the operable and preferred ranges for these catalysts as previously given, results in hydrogenation of both the ethylenic double bonds and the aldehyde group and saturated alcohols result. In between these two extremes varying degrees of selectivity may be obtained using varied conditions of temperature and pressure, and using other catalysts under varied conditions.

After hydrogenation, the catalyst is removed in any desirable manner preferably by means of filtration. The solvent, if any is present, is removed by distillation. The product may then, if desired, be purified by means of distillation, preferably vacuum distillation. In this way any polymeric alcohols, which may be present in small amounts, may be separated from the lower boiling monomeric alcohols. These polymeric alcohols comprise products formed during the hydrogenation, particularly at high temperatures. For example, the condensates of one molecule of acrolein per molecule of acyclic terpene may polymerize and the polymer may then react with hydrogen to form an alcohol. It is possible, too, that the monomeric alcohol may first form, followed by polymerization. The monomeric alcohols are liquids, whereas the polymeric alcohols are soft resins.

In addition, if, for example, an acyclic terpene-acrolein condensate, which does not consist entirely of the condensate which is formed from one molecule of acyclic terpene per molecule of acrolein, is used in the hydrogenation, alcohols formed upon hydrogenation may be separated by vacuum distillation.

This process of vacuum distillation will enable, in addition, the separation of any polymers of condensation products of acyclic terpenes and acrolein, which may have been present originally or which may have been formed during the hydrogenation. The probability is, however, that this polymerized condensate will ultimately be hydrogenated and be separated from the monomeric alcohols as a polymeric alcohol residue. Vacuum distillation is also effective in separating color bodies if they are present in the crude hydrogenation product.

If desired, a suitable solvent may be employed during the hydrogenation process. Such solvents may be polar or non-polar in nature and may comprise saturated alcohols, such as methanol, ethanol, propanol, isopropanol, butanol, etc.; ethers such as ethyl ether, isopropyl ether, dioxane, etc.; esters such as ethyl acetate, butyl acetate, etc.; saturated hydrocarbons, such as gasoline, hexane, cyclohexane, petroleum ether, etc.; organic acids, such as acetic acid, propionic acid, butyric acid, etc. If an organic acid is employed as the solvent, it is preferable to use it in conjunction with noble metal catalysts. The solvent may be removed following separation of the catalyst, by means of distillation, preferably in vacuo. As an alternative procedure, in accordance with the invention, any of the acyclic-acrolein condensates may be hydrogenated by means of a nascent hydrogen. In general, this method is less satisfactory than that of catalytic hydrogenation. Reducing agents which may be employed when nascent hydrogen is employed include sodium amalgam-dilute acid, zinc dust-glacial acetic acid, sodium and ethyl alcohol, etc., using temperatures of from 40° C. to 150° C. In general, these reducing agents are selective for the aldehyde group, the ethylenic double bonds remaining substantially unhydrogenated.

The alcohols produced by virtue of this invention are useful in the manufacture of various esters from which can be made insecticides, etc., and in the manufacture of resins by esterification with mono- or poly-basic acids. They may be sulfonated to produce emulsifying, wetting, and sudsing agents which are used in the form of their alkali and organic base salts. The monomeric alcohols themselves possess wetting and detergent properties when emulsified in water.

This application constitutes a continuation-in-part of my application for U. S. Letters Patent, Serial No. 396,216, filed May 31, 1941.

What I claim and desire to protect by Letters Patent is:

1. Dimethyl(butyl)hexahydrobenzyl alcohol.
2. Isohexyl hexahydrobenzyl alcohol.
3. The method of producing a primary alcohol from a condensation product of an acyclic terpene having three double bonds per molecule with acrolein, which comprises hydrogenating said condensation product in contact with an active hydrogenation catalyst.
4. The method of producing a primary alcohol from a condensation product of an acyclic terpene having three double bonds per molecule with acrolein, which comprises hydrogenating said condensation product in contact with an active base metal hydrogenation catalyst.
5. The method of producing a primary alcohol from a condensation product of an acyclic terpene having three double bonds per molecule with acrolein, which comprises hydrogenating said condensation product in contact with an active noble metal hydrogenation catalyst.
6. The method of producing a primary alcohol from a condensation product of an acyclic terpene having three double bonds per molecule with acrolein, which comprises hydrogenating said condensation product in contact with an active copper chromite catalyst.
7. The method of producing a primary alcohol from a condensation product of an acyclic terpene having three double bonds per molecule with acrolein, which comprises hydrogenating said condensation product in contact with an active base metal catalyst at a temperature within the range of from about 100° C. to about 200° C. and at a pressure within the range of from about 250 lbs. per square inch to about 3000 lbs. per square inch.
8. The method of producing a primary alcohol from a condensation product of an acyclic terpene having three double bonds per molecule with acrolein, which comprises hydrogenating said condensation product in contact with an active noble metal catalyst at a temperature of from about 25° C. to about 100° C. and at a pressure of from about 15 lbs. per square inch to about 100 lbs. per square inch.
9. The method of producing a primary alcohol from a condensation product of an acyclic terpene having three double bonds per molecule with acrolein, which comprises hydrogenating said condensation product in contact with an active copper chromite catalyst at a temperature of from about 100° C. to about 200° C. and at a pressure of from about 250 lbs. per square inch to about 3000 lbs. per square inch.
10. As a new product a substituted hydrobenzyl alcohol selected from the group consisting of dimethyl(butyl)hexahydrobenzyl alcohol, isohexenyl tetrahydrobenzyl alcohol and isohexyl hexahydrobenzyl alcohol.

ALFRED L. RUMMELSBURG.